(12) United States Patent
Christian

(10) Patent No.: US 10,113,276 B2
(45) Date of Patent: Oct. 30, 2018

(54) COLD IN-PLACE RECYCLING MACHINE WITH SURGE TANK

(71) Applicant: Roadtec, Inc., Chattanooga, TN (US)

(72) Inventor: Richard Christian, Chattanooga, TN (US)

(73) Assignee: Roadtec, Inc., Chattanooga, TN (US)

(*) Notice: Subject to any disclaimer, the term of this patent is extended or adjusted under 35 U.S.C. 154(b) by 0 days.

(21) Appl. No.: 15/711,340

(22) Filed: Sep. 21, 2017

(65) Prior Publication Data

US 2018/0100277 A1    Apr. 12, 2018

Related U.S. Application Data

(60) Provisional application No. 62/406,497, filed on Oct. 11, 2016.

(51) Int. Cl.
| | | |
|---|---|---|
| *E01C 23/088* | (2006.01) | |
| *E01C 19/17* | (2006.01) | |
| *E01C 19/10* | (2006.01) | |
| *E01C 23/06* | (2006.01) | |

(52) U.S. Cl.
CPC .......... *E01C 23/088* (2013.01); *E01C 19/176* (2013.01); *E01C 23/065* (2013.01); *E01C 2019/1081* (2013.01)

(58) Field of Classification Search
CPC ...... E01C 23/06; E01C 23/065; E01C 23/088; E01C 19/176; E01C 2019/1081
USPC ...................... 404/84.05–111, 129
See application file for complete search history.

(56) References Cited

U.S. PATENT DOCUMENTS

| | | | |
|---|---|---|---|
| 1,804,592 A | | 5/1931 | Chase |
| 3,106,344 A | | 10/1963 | Baird, Jr. et al. |
| 4,220,998 A | * | 9/1980 | Kays ................... A01M 7/0089 |
| | | | 239/162 |
| 5,000,615 A | * | 3/1991 | Murray ................. E01C 23/065 |
| | | | 404/101 |
| 5,219,450 A | | 6/1993 | Thurk |
| 7,544,253 B2 | * | 6/2009 | Kleiger ................ B08B 9/0321 |
| | | | 134/10 |
| 2003/0194273 A1 | | 10/2003 | Lloyd |
| 2008/0193214 A1 | | 8/2008 | Hall et al. |

(Continued)

FOREIGN PATENT DOCUMENTS

GB        156516        8/1921

OTHER PUBLICATIONS

International Search Report and Written Opinion of Counterpart PCT Application No. PCT/US2017/052678 filed Sep. 21, 2017.

(Continued)

*Primary Examiner* — Raymond W Addie
(74) *Attorney, Agent, or Firm* — Chambliss, Bahner & Stophel, P.C.

(57) ABSTRACT

A CIR-modified milling machine includes a milling drum that is adapted to mill material from a roadway, which milling drum is contained in a milling drum housing. An additive spray assembly is located within the milling drum housing and adapted to dispense an asphalt additive therein. An additive flow system includes an inlet line that is adapted to be operatively connected to an external supply line, a surge tank for asphalt additive that is in fluid communication with the additive spray assembly, and an additive pump for pumping asphalt additive from the surge tank to the additive spray assembly.

12 Claims, 5 Drawing Sheets

(56) References Cited

U.S. PATENT DOCUMENTS

| | | | |
|---|---|---|---|
| 2008/0226392 A1 | 9/2008 | Lloyd | |
| 2010/0008725 A1* | 1/2010 | Sampson | E01C 19/238 404/128 |
| 2015/0098760 A1* | 4/2015 | Menzenbach | B05B 1/3046 404/75 |
| 2015/0275442 A1 | 10/2015 | Heusinger et al. | |
| 2015/0376847 A1 | 12/2015 | Schlenker | |
| 2016/0108586 A1* | 4/2016 | Huhn | E01C 23/065 404/90 |
| 2016/0053446 A1 | 5/2016 | Killion et al. | |

OTHER PUBLICATIONS

Co-Pending Application—Invitation to Pay Additional Fees of counterpart PCT Application No. PCT/US17/68521 dated Apr. 4, 2018.

* cited by examiner

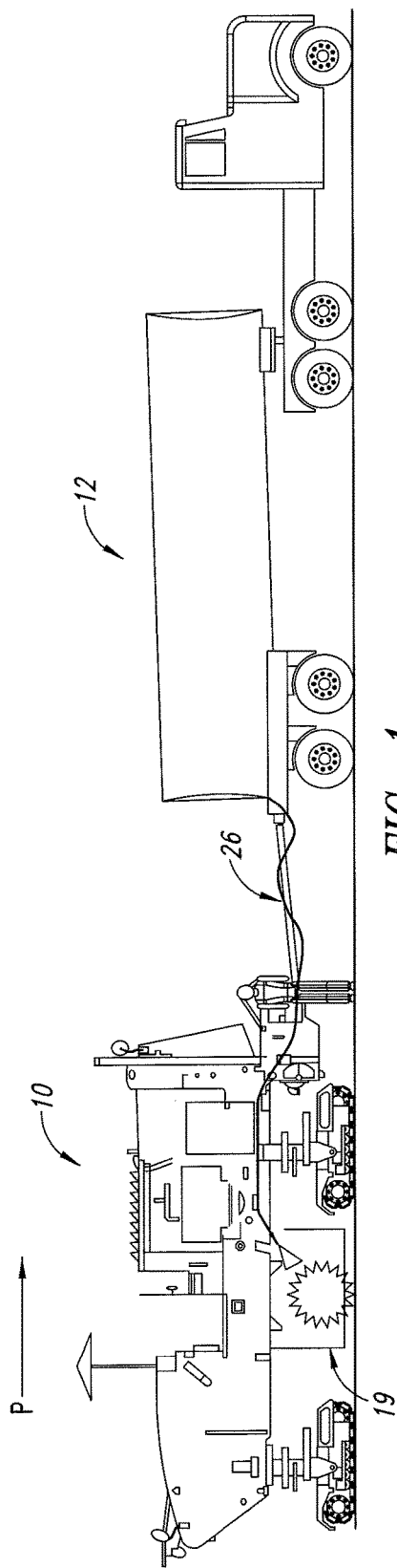
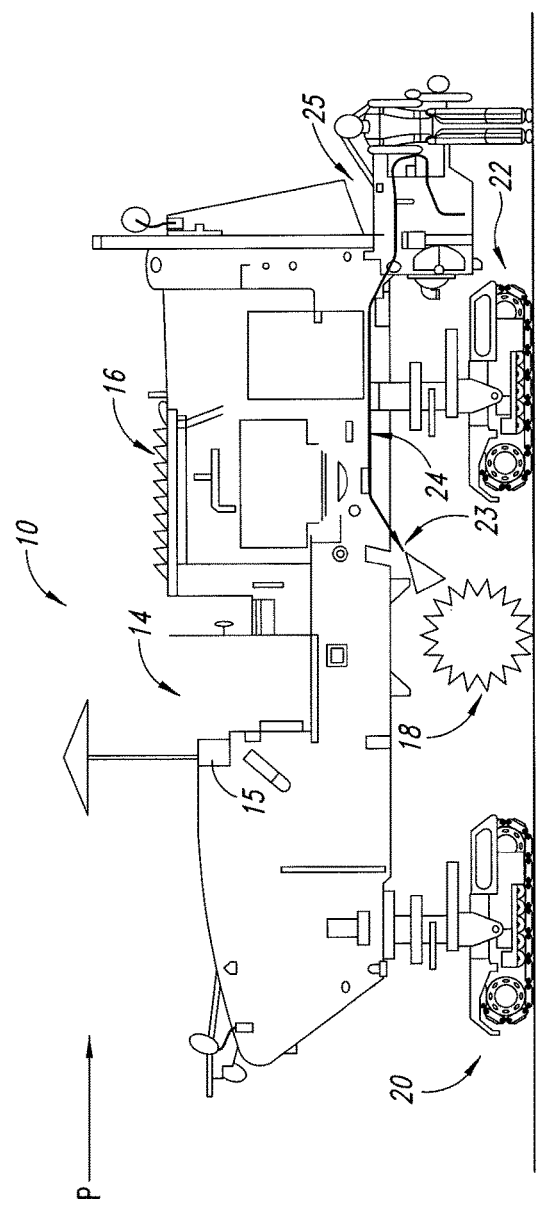

COLD IN-PLACE RECYCLING MACHINE WITH SURGE TANK

CROSS-REFERENCE TO RELATED APPLICATION

This application claims the benefit of U.S. Provisional Patent Application No. 62/406,497 which was filed on Oct. 11, 2016.

FIELD OF THE INVENTION

The present invention relates generally to repair and repaving of roadways with asphalt paving material. More particularly, the invention relates to equipment for use in cold in-place repaving of roadways with recycled asphalt material.

BACKGROUND OF THE INVENTION

Roadway repair is often accomplished by overlaying the existing pavement (whether of concrete or asphalt paving material) with a new layer (often called a leveling course) of concrete or asphalt paving material. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth to be filled across the width) as in the undamaged areas. The resulting reduced density in the overlay of the previously damaged areas will lead to renewed rutting or other wear damage in the new pavement in relatively short order. However, by milling the surface of the damaged pavement to a uniform surface elevation below the level of the damage, the addition of new pavement will produce a road surface having a consistent elevation across the entire width of the roadway. This repaving technique can be used to return the elevation of a damaged roadway to its original pre-damaged elevation, whereas the placement of a leveling course atop damaged but un-milled pavement will tend to raise the surface of the roadway or some portion thereof above its original elevation. Roadway repair without milling can require the raising of road shoulders, guardrails and manhole covers and the adjustment of overpass clearances, all of which is unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine includes a milling drum with a plurality of cutter teeth mounted thereon which is contained within a milling drum housing. The milling machine is adapted to be advanced across a road surface to "mill" the surface to remove asphalt concrete pavement or Portland cement concrete pavement in preparation for recycling the pavement and/or in preparation for applying a pavement overlay. A milling machine typically includes one or more conveyors to take the milled material from the vicinity of the milling drum and direct it away from the machine and into an adjacent dump truck. A road stabilizer/reclaimer machine is similar to a milling machine in that it comprises a wheeled or track-driven vehicle that includes a milling drum with a plurality of cutter teeth mounted thereon which is contained within a milling drum housing. However, the milling drum of a road stabilizer/reclaimer machine is generally employed to mill or pulverized an existing road bed or roadway to a greater depth than does a milling machine prior to repaving (usually called reclaiming) or prior to initial paving (usually called stabilizing), and it leaves the pulverized material in place.

Cold In-place Recycling ("CIR") equipment can be used to repair damage to a roadway in a single pass, while reusing essentially all of the existing asphalt material. In the CIR process, damaged layers of asphalt pavement are removed. The removed material is processed and replaced on the roadway and then compacted. If a roadway has good structural strength, CIR can be an effective treatment for all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. The root cause of the pavement failure should always be investigated to rule out base failure. However, CIR can almost always be used when there is no damage to the base of the roadway. Generally, CIR is only half as expensive as hot mix paving while providing approximately 80% of the strength of hot mix paving.

CIR can be carried out with the aid of a milling machine or a road stabilizer/reclaimer machine that has been modified by mounting an additive spray assembly in the milling drum housing to inject an asphalt additive such as an asphalt emulsion or foamed asphalt cement into the milling drum housing. The asphalt additive is then thoroughly blended with the milled material by the milling drum and can be left in a windrow or fed by the milling machine's discharge conveyor directly into a paving machine. Generally, the asphalt additive is supplied from a separate additive supply tanker truck that is coupled to the modified milling machine or the modified road stabilizer/reclaimer machine. The asphalt additive is drawn directly from the tank on the additive supply truck and pumped to the spray assembly in the milling drum housing.

Since the CIR process uses asphalt paving material that is already in place on the roadway, the only other component of the new pavement is the asphalt additive carried by the tanker truck. Consequently, conventional systems require that the modified milling machine or modified road stabilizer/reclaimer machine be coupled to the tanker truck during all phases of the CIR process. This makes it difficult to operate a CIR-modified machine around tight corners and through intersections. Consequently, it would be desirable if a method and apparatus could be provided that would allow an operator of a CIR-modified machine to continue to mill and process milled material through intersections, around tight corners and while switching out an empty tanker truck for a full one.

ADVANTAGES OF THE INVENTION

Among the advantages of a preferred embodiment of the invention is that it provides a method and apparatus that allows a CIR-modified machine to continue to mill and process milled material through intersections, around tight corners and while switching out an empty tanker truck for a full one. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship. The term "fluid communication" is such an attachment, coupling or connection that allows for flow of fluid from one such structure or component to or by means of the other.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The terms "asphalt paving material(s)" and "asphalt concrete" refer to a paving mixture or mat that is comprised of asphalt cement and any of various aggregate materials.

The term "asphalt cement" and similar terms refer to a binder that is used in combination with aggregate materials in the production of asphalt concrete.

The term "asphalt additive" and similar terms refer to a liquid additive containing asphalt cement. An asphalt additive may comprise asphalt cement, cutback asphalt, an asphalt cement emulsion and/or foamed asphalt cement.

The term "milling machine" refers to a machine having a milling or working drum that is adapted to be placed into contact with a roadway or road base surface for removing a portion of the surface. The term "milling machine" includes but is not limited to machines that are sometimes referred to as road stabilizers and roadway reclaiming machines.

The term "CIR-modified milling machine" refers to a milling machine which has been modified by the addition of an additive flow system including a spray assembly that is mounted in the milling drum housing to inject an asphalt additive into the milling drum housing.

The term "processing direction" refers to the primary direction of travel of a CIR-modified milling machine as it operates on a roadway.

The term "CIR train" refers to a combination of a CIR-modified milling machine and an asphalt additive tanker truck that are used together in a CIR process.

The terms "front", "forward" and similar terms, when used with respect to a CIR-modified milling machine or a component of such a machine, refer to a relative location or direction towards the leading end of the CIR-modified milling machine as it travels in the processing direction.

The term "rear" and similar terms, when used with respect to a CIR-modified milling machine or a component of such a machine, refer to a relative location or direction towards the trailing end of the CIR-modified milling machine as it travels in the processing direction.

SUMMARY OF THE INVENTION

The invention comprises an additive flow system for a CIR-modified milling machine that includes a surge tank for containing a quantity of an asphalt additive. Asphalt additive may be pumped from the surge tank to the additive spray assembly of the CIR-modified milling machine. More particularly, the invention comprises a CIR-modified milling machine having a milling drum that is adapted to mill material from a roadway and a milling drum housing that contains the milling drum. An additive spray assembly is located within the milling drum housing and adapted to dispense an asphalt additive therein. An additive flow system includes an inlet line that is adapted to be operatively connected to an external supply line. The additive flow system also includes surge tank for asphalt additive that is in fluid communication with the additive spray assembly, and an additive pump for pumping asphalt additive from the surge tank to the additive spray assembly.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein:

FIG. 1 is a side view of a CIR train comprised of a CIR-modified milling machine that includes the invention and an additive supply tank truck.

FIG. 2 is a side view of the CIR-modified milling machine that includes the invention which is shown in FIG. 1.

DESCRIPTION OF THE PREFERRED EMBODIMENT OF THE INVENTION

Figure 3:
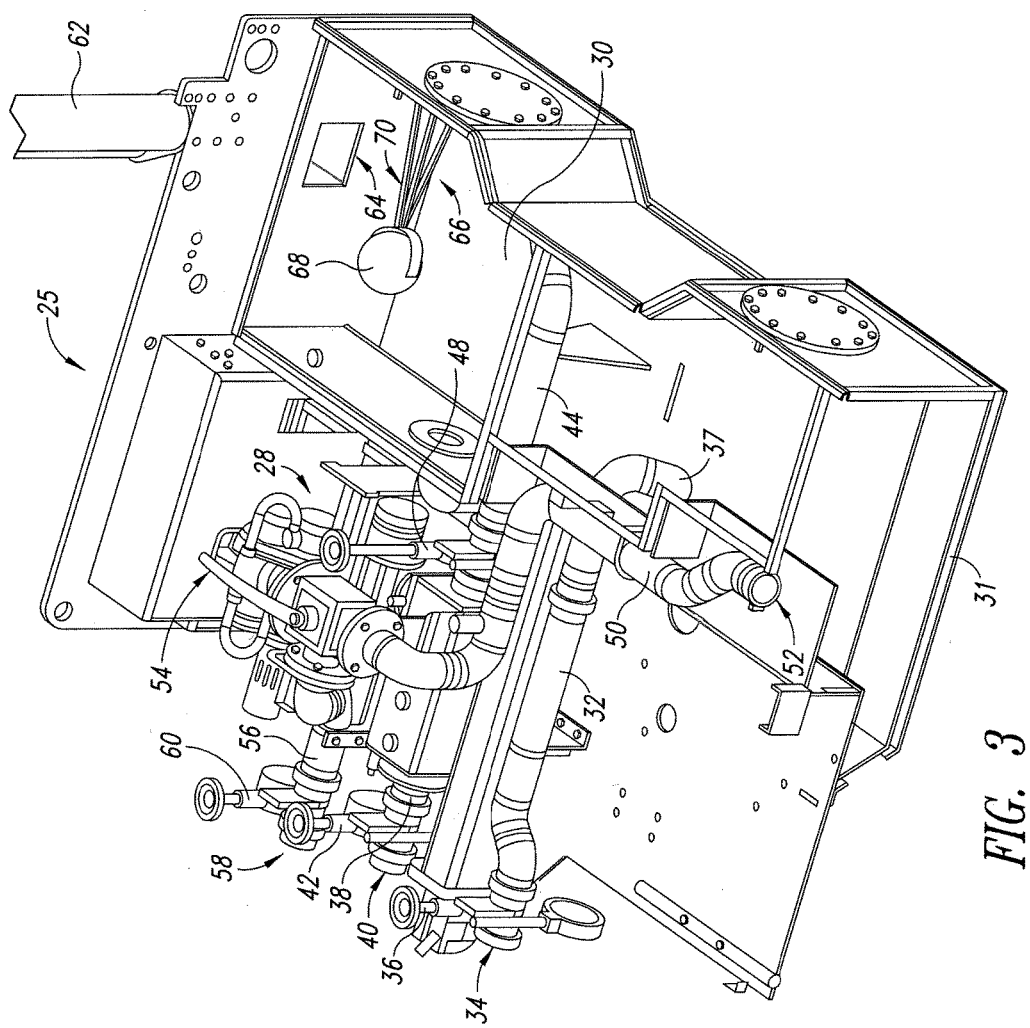
FIG. 3 is a top perspective view of the surge tank, pump, piping, valves and float assembly of a preferred embodiment of the additive flow system of the invention.

This description of a preferred embodiment of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

FIG. 1 shows a CIR train comprised of CIR-modified milling machine 10 that includes the invention which is coupled to an external source of asphalt additive in the form of additive supply tank truck 12. Milling machine 10, also shown in FIG. 2, includes operator's station 14 and an engine, typically a diesel engine (not shown) that is enclosed in engine compartment 16. Operator's station 14 includes controller 15 and all of the operating controls necessary for driving and steering the CIR-modified milling machine, rotating milling drum 18, and controlling and/or monitoring certain aspects of the invention.

Controller 15 may embody a single microprocessor or multiple microprocessors that include components for controlling the operations of milling machine 10 based on input from an operator of the milling machine and on sensed or other known operational parameters. Controller 15 may include or be associated with a memory, a data input component such as a touch screen and/or a plurality of actuating buttons, a data output component such as a display screen, a secondary storage device, a processor and other components for running an application. Various circuits may be associated with and operatively connected to controller 15, such as power supply circuitry and hydraulic circuitry. Numerous commercially available microprocessors can be configured to perform the functions of controller 15. It should be appreciated that controller 15 could readily be embodied in a general purpose computer or machine microprocessor capable of controlling numerous milling machine functions.

Power from the engine is transmitted by a drive belt (not shown), or other means known to those having ordinary skill in the art to which the invention relates, to milling drum 18, which is located in a conventional milling drum housing 19 (shown in schematic or outline form in FIG. 1). Milling drum 18 includes a plurality of cutter teeth that are adapted to mill the road surface as the milling drum rotates and the machine is advanced along the roadway in the processing direction "P".

Power from the engine is also transmitted, by means known to those having ordinary skill in the art to which the invention relates, to rear track drive assembly 20 and front track drive assembly 22. CIR-modified milling machine 10 may include one or two rear drive track assemblies, each of which can be raised and lowered relative to the machine main frame. Typically, there are also two front drive track assemblies (such as assembly 22), each of which can be raised and lowered relative to the machine main frame. Either or both of the rear track drive assemblies and the front track drive assemblies can be turned to the left and the right to steer machine 10. Other embodiments of CIR-modified milling machines (not shown in the drawings) may include wheel drive assemblies instead of track drive assemblies.

CIR-modified milling machine 10 includes additive spray assembly 23 comprising one or more spray nozzles, which assembly is mounted within milling drum housing 19. Additive spray assembly 23 is adapted to dispense an asphalt additive obtained from onboard supply line 24 which is in fluid communication, by means of additive flow system 25, with external supply line 26 from an external source such as the additive tank on additive supply tank truck 12. As best shown in FIGS. 3-6, additive flow system 25 includes additive pump 28 and surge tank 30, which is in fluid communication with external supply line 26. In a preferred embodiment of the invention, surge tank 30 is provided with thermal insulating panels 31 on at least some of its external surfaces in order to insure that the asphalt additive retains a suitable viscosity to allow flow through the various components of additive flow system 25.

Although the illustrated embodiment of the invention comprises surge tank 30 that is located adjacent to additive pump 28 and the other components of additive flow system on the front end of CIR-modified milling machine 10, the surge tank may be located separately from the other components of the invention, such as, for example, on the rear end of the CIR-modified milling machine, if desired to improve the weight distribution of the components of the invention on the machine.

Additive flow system 25 includes, in addition to additive pump 28 and surge tank 30, piping and associated valves that permit operation of the preferred embodiment of the invention in multiple modes. Thus, as shown in FIGS. 3-6, first inlet pipe 32 has first inlet opening 34 and first valve 36 for controlling the flow through first inlet pipe 32 and first outlet 37 of first inlet pipe 32 into surge tank 30. Second inlet pipe 38 has second inlet opening 40 and second valve 42 for controlling the flow through second inlet pipe 38. Third inlet pipe 44 has third inlet opening 46 into surge tank 30 and third valve 48 for controlling the flow through third inlet pipe 44. First outlet pipe 50 has first outlet 52. Fourth valve 54 is provided for controlling the flow through additive pump 28. Second outlet pipe 56 has second outlet 58 and fifth valve 60 for controlling the flow through second outlet pipe 56. Surge tank 30 also includes air vent 62 and vent opening 64, as well as float valve 66 comprising float 68 which is attached by means of float attachment 70 to horizontal float rod 72 (shown in FIG. 4). Float 68 is adapted to float on the surface of asphalt additive in surge tank 30, and horizontal float rod 72 is attached to float level gauge 74 on the outside of surge tank 30. Because float 68 is adapted to cause horizontal float rod 72 to pivot about its longitudinal axis as the surface level of asphalt additive in surge tank 30 changes, float level gauge 74 provides a visual indicator of the amount of asphalt additive in the surge tank. In addition, float level sensor 76 is operatively attached to float level gauge 74 and to controller 15 so that float level sensor may send a signal to controller 15 to alert an operator of the level of asphalt additive in surge tank 30.

When external supply line 26 is attached to first inlet opening 34 of first inlet pipe 32 and onboard supply line 24 is attached to first outlet 52 of first outlet pipe 50, a first mode of operation of the invention may be employed. In this first mode, first valve 36, third valve 48 and fourth valve 54 are opened, and second valve 42 and fifth valve 60 are closed. Then, pump 28 may be activated to draw asphalt additive from an external source such as tanker truck 12, through first inlet pipe 32 and out first outlet 37 into surge tank 30, and back out of surge tank 30 through third inlet opening 46, third inlet pipe 44, pump 28, and out first outlet pipe 50 through onboard supply line 24 to additive spray assembly 23.

When external supply line 26 is attached to second inlet opening 40 of second inlet pipe 38 and onboard supply line 24 is attached to first outlet 52 of first outlet pipe 50, a second mode of operation of the invention, in which the surge tank is bypassed, may be employed. In this second mode, second valve 42 and fourth valve 54 are opened, and first valve 36, third valve 48 and fifth valve 60 are closed. Then, pump 28 may be activated to draw asphalt additive from tanker truck 12 through second inlet pipe 38, through pump 28 and out first outlet pipe 50 through onboard supply line 24 to additive spray assembly 23.

When no external supply line is attached to additive flow system 25, but onboard supply line 24 is attached to first outlet 52 of first outlet pipe 50, a third mode of operation may be employed by which asphalt additive is pumped from surge tank 30 through onboard supply line 24 to additive spray assembly 23. In this third mode, third valve 48 and fourth valve 54 are opened, and first valve 36, second valve 42 and fifth valve 60 are closed. Then, pump 28 may be activated to draw asphalt additive out of surge tank 30 through third inlet opening 46, third inlet pipe 44, pump 28, and out first outlet pipe 50 through onboard supply line 24 to additive spray assembly 23.

When external supply line 26 is attached to second inlet opening 40 of second inlet pipe 38, a fourth mode of operation of the invention may be employed to transfer asphalt additive from a first external source such as tanker truck 12 to a second external location such as a second tanker truck (not shown, but substantially similar to tanker truck 12), or to another CIR-modified milling machine (not shown), or to a separate asphalt additive storage tank (also not shown). In this fourth mode, second valve 42, fourth valve 54 and fifth valve 60 are opened, and first valve 36 and third valve 48 are closed. Then, pump 28 may be activated to draw asphalt additive from tanker truck 12 through second inlet pipe 38, through pump 28 and out second outlet pipe 56 to a second external supply line (not shown, but substantially similar to external supply line 26) to the second tanker truck, to another CIR-modified milling machine, or to a separate asphalt additive storage tank.

Figure 4:
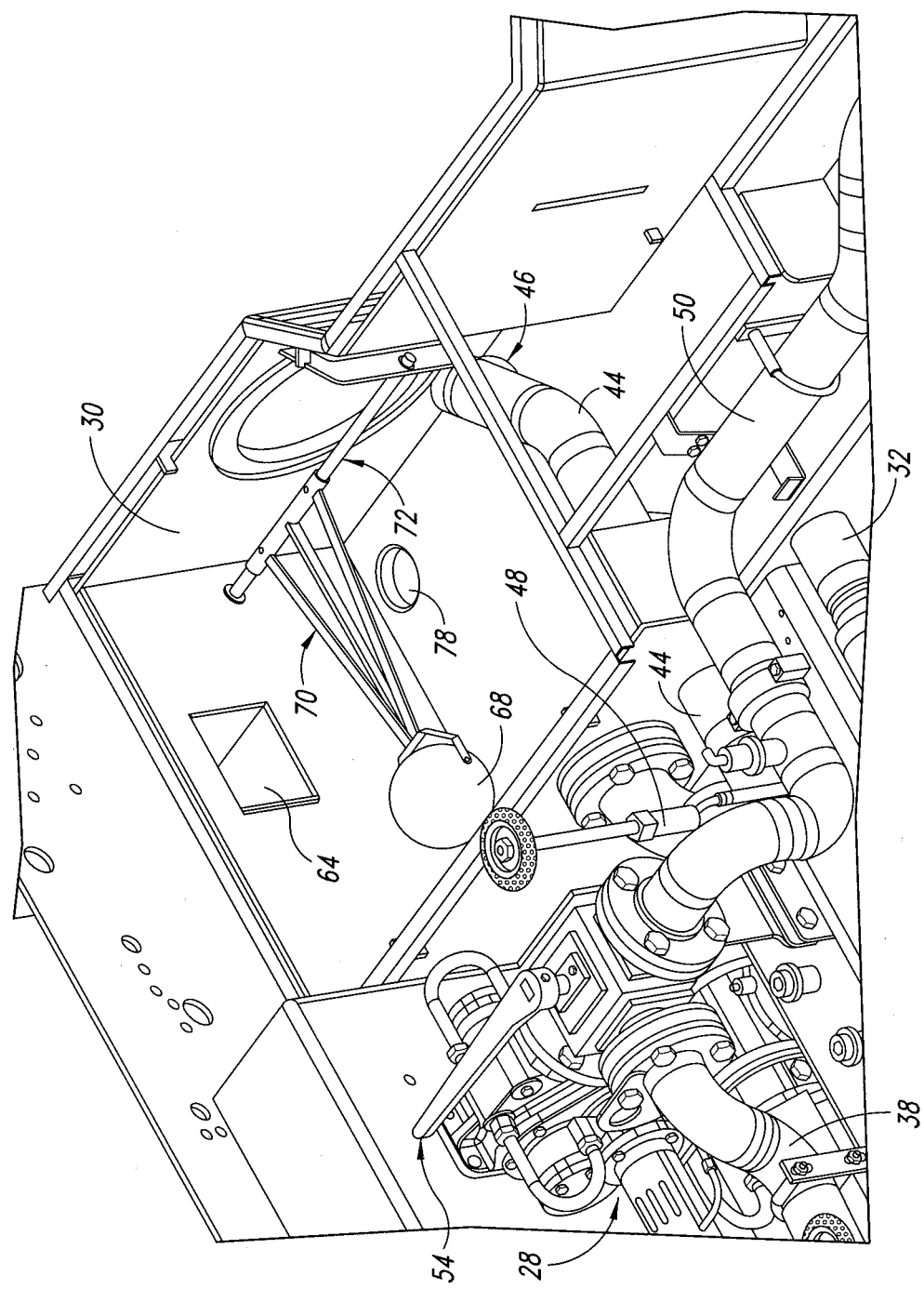
FIG. 4 is a top perspective view of a portion of the surge tank, pump, piping, valves and float assembly of the embodiment of the additive flow system that is shown in FIG. 3.
Figure 5:
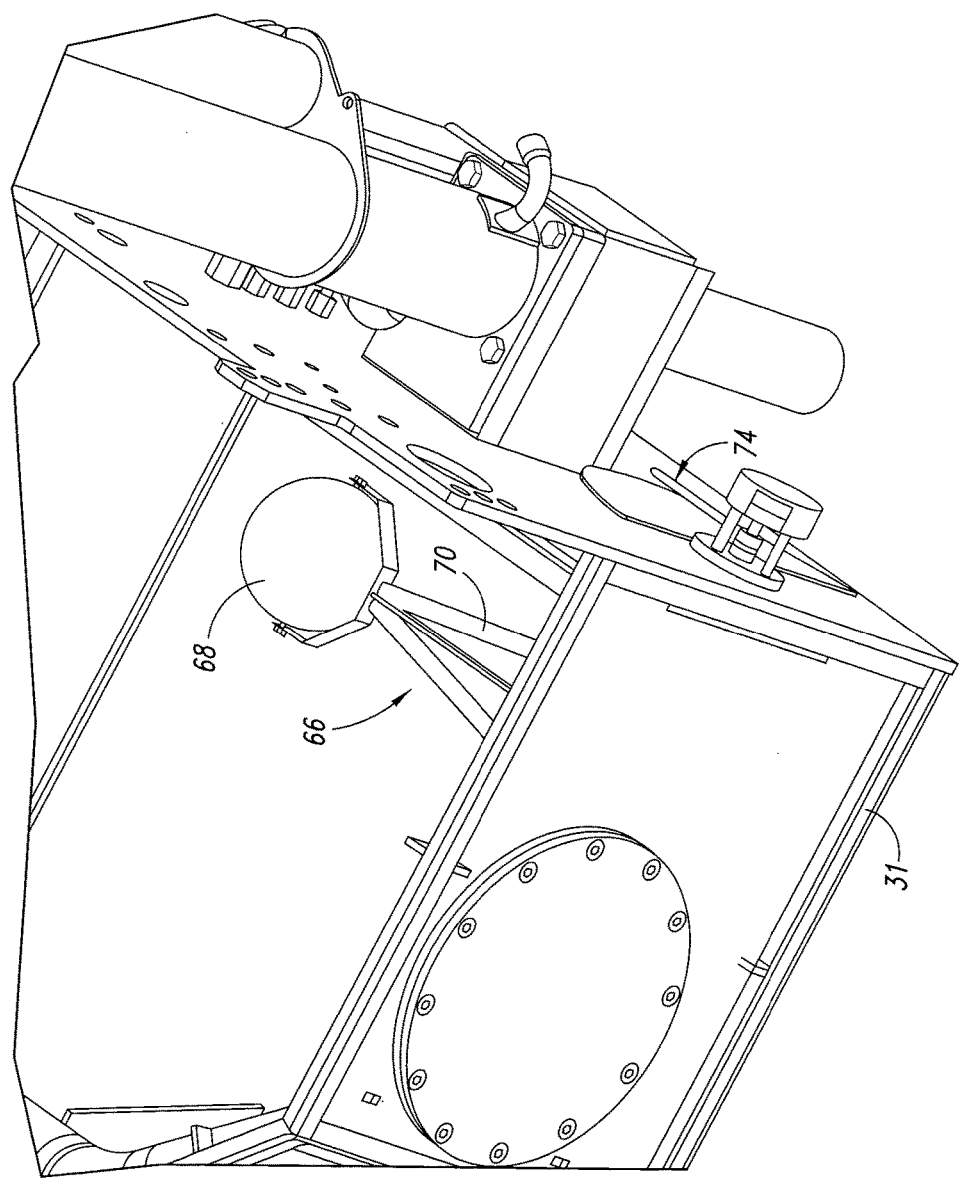
FIG. 5 is a top perspective view of a portion of the surge tank and the float assembly of the embodiment of the additive flow system that is shown in FIGS. 3 and 4.
Figure 6:
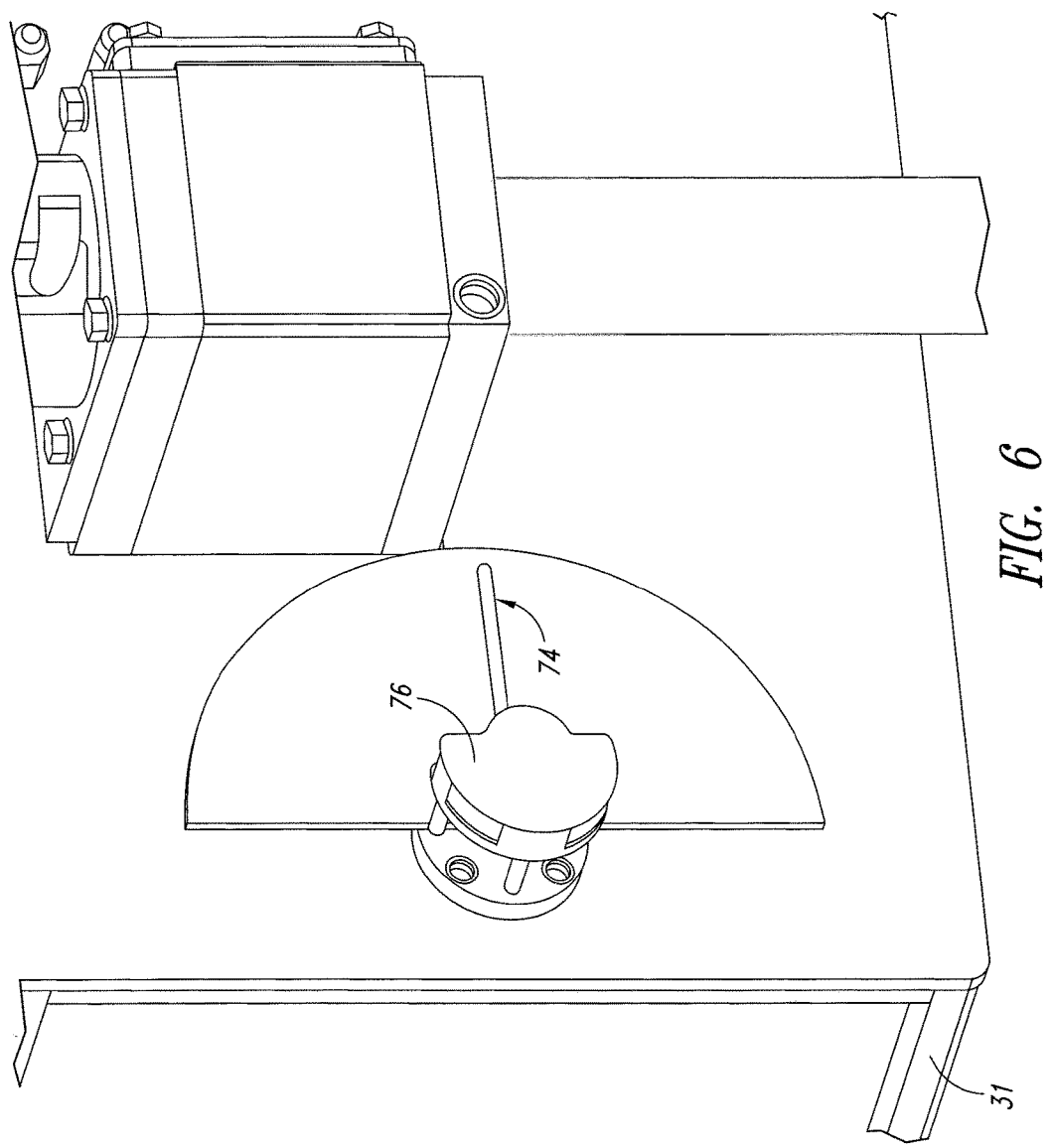
FIG. 6 is a side perspective view of a portion of the surge tank and the float assembly of the embodiment of the additive flow system that is shown in FIGS. 3-5.

It is also possible to flush surge tank 30 with a solvent in order to clean out the tank, in a fifth mode of operation of the invention. In this fifth mode, a source of solvent (not shown) is connected through an external supply line (not shown, but substantially similar to external supply line 26) to first inlet opening 34 of first inlet pipe 32. In this mode of operation, drain 78 in the bottom of surge tank 30 is opened (as shown in FIG. 4), as are first valve 36 and fourth valve 54. Second valve 42, third valve 48 and fifth valve 60 are closed. Then, pump 28 may be activated to draw the solvent through first inlet pipe 32 and out first outlet 37 into surge tank 30, and back out of surge tank 30 through drain 78.

The invention provides an additive flow system which includes a surge tank for asphalt additive. The invention permits a CIR-modified milling machine equipped with the invention to mill and process milled material through intersections, around tight corners and while switching out an empty additive tanker truck for a full one. Preferably, the additive flow system includes piping and associated valves that permit operation of the additive flow system in multiple modes, as described hereinabove.

Although this description contains many specifics, these should not be construed as limiting the scope of the invention but as merely providing illustrations of the presently preferred embodiment thereof, as well as the best mode contemplated by the inventor of carrying out the invention. The invention, as described and claimed herein, is susceptible to various modifications and adaptations, as would be understood by those having ordinary skill in the art to which the invention relates.

What is claimed is:

1. A CIR-modified milling machine comprising:
   (a) a milling drum that is adapted to mill material from a roadway;
   (b) a milling drum housing that contains the milling drum;
   (c) an additive spray assembly that is located within the milling drum housing and adapted to dispense an asphalt additive therein;
   (d) an additive flow system:
      (i) which includes an inlet pipe that is adapted to be operatively connected to an external supply line;
      (ii) comprising a surge tank for asphalt additive that is in fluid communication with the additive spray assembly;
      (iii) comprising an additive pump for pumping asphalt additive from the surge tank to the additive spray assembly;
      wherein the additive flow system includes piping and associated valves that permit operation of the additive flow system in a first mode in which the additive pump is adapted to draw asphalt additive from an external supply into the surge tank by means of the external supply line, and to pump the asphalt additive out of the surge tank to the additive spray assembly, and alternatively in a second mode in which the additive pump is adapted to draw asphalt additive from an external supply by means of the external supply line and to pump the asphalt additive out to the additive spray assembly while bypassing the surge tank.

2. The CIR-modified milling machine of claim 1 wherein the additive flow system includes piping and associated valves that also permit operation of the additive flow system in a mode in which the additive pump is adapted to pump asphalt additive from the surge tank to the additive spray assembly when no external supply line is attached to the additive flow system.

3. The CIR-modified milling machine of claim 1 wherein the additive flow system:
   (a) includes a drain in the surge tank, which drain may be opened;
   (b) includes piping and associated valves that permit operation of the additive flow system in a mode in which the additive pump is adapted to draw a solvent through the external supply line and into the surge tank so as to drain out through the open drain in the surge tank in order to clean out the surge tank.

4. The CIR-modified milling machine of claim 1 wherein the additive flow system:
   (a) includes an air vent and a vent opening into the surge tank
   (b) is operated without pressurizing the surge tank.

5. The CIR-modified milling machine of claim 1 wherein the surge tank is provided with thermal insulating panels on at least some of its external surfaces.

6. The CIR-modified milling machine of claim 1 wherein the additive flow system includes piping and associated valves that also permit operation of the additive flow system in a mode in which the additive pump is adapted to draw asphalt additive from a first external supply and to pump the asphalt additive to a second external location.

7. The CIR-modified milling machine of claim 1 wherein the additive flow system includes a float valve comprising a float which is adapted to float on the surface of asphalt additive in the surge tank.

8. The CIR-modified milling machine of claim 7:
(a) which includes a controller;
(b) wherein the additive flow system further comprises:
 (i) a float level gauge that provides a visual indicator of the amount of asphalt additive in the surge tank;
 (ii) a float level sensor that is operatively attached to the controller and adapted to send a signal to the controller of the level of asphalt additive in the surge tank.

9. A CIR-modified milling machine comprising:
(a) a milling drum that is adapted to mill material from a roadway;
(b) a milling drum housing that contains the milling drum;
(c) an additive spray assembly that is located within the milling drum housing and adapted to dispense an asphalt additive therein;
(d) an additive flow system comprising:
 (i) a surge tank for asphalt additive that is in fluid communication with the additive spray assembly;
 (ii) an additive pump for pumping asphalt additive from the surge tank to the additive spray assembly;
 (iii) a first inlet pipe having a first inlet opening and a first outlet into the surge tank;
 (iv) a first valve for controlling the flow through the first inlet pipe;
 (v) a second inlet pipe having a second inlet opening;
 (vi) a second valve for controlling the flow through the second inlet pipe;
 (vii) a third inlet pipe having a third inlet opening into the surge tank;
 (viii) a third valve for controlling the flow through the third inlet pipe;
 (ix) a first outlet pipe having a first outlet;
 (x) a fourth valve for controlling the flow through the additive pump;
 (xi) a second outlet pipe having a second outlet;
 (xii) a fifth valve for controlling the flow through the second outlet pipe;
(e) wherein the CIR-modified milling machine is adapted to be operated in a first mode of operation, when:
 (i) an external supply line is attached between the first inlet opening of the first inlet pipe and an external source of supply; and
 (ii) an onboard supply line is attached between the first outlet of the first outlet pipe and the additive spray assembly; and
 (iii) the first valve, the third valve and the fourth valve are opened; and
 (iv) the second valve and the fifth valve are closed; and
 the additive pump is activated to draw asphalt additive through the external supply line from the external source of supply, through the first inlet pipe, and out the first outlet into the surge tank, and back out of the surge tank through the third inlet opening, the third inlet pipe, the additive pump, and out the first outlet pipe through the onboard supply line to the additive spray assembly; and
(f) wherein the CIR-modified milling machine is also adapted to be operated in a second mode of operation in which the surge tank is bypassed, when:
 (i) an external supply line is attached between the second inlet opening of the second inlet pipe and an external source of supply; and
 (ii) an onboard supply line is attached between the first outlet of the first outlet pipe and the additive spray assembly; and
 (iii) the second valve and the fourth valve are opened; and
 (iv) the first valve, the third valve and the fifth valve are closed; and
 the additive pump is activated to draw asphalt additive through the external supply line from the external source of supply, through the second inlet pipe, through the additive pump and out the first outlet pipe through the onboard supply line to the additive spray assembly.

10. The CIR-modified milling machine of claim 9 which is adapted to be operated in a third mode of operation when no external supply line is attached to the additive flow system, when:
(a) an onboard supply line is attached between the first outlet of the first outlet pipe and the additive spray assembly; and
(b) the third valve and the fourth valve are opened; and
(c) the first valve, the second valve and the fifth valve are closed; and
the additive pump is activated to draw asphalt additive out of the surge tank through the third inlet opening, the third inlet pipe, the additive pump, and out the first outlet pipe through the onboard supply line to the additive spray assembly.

11. The CIR-modified milling machine of claim 9 which is adapted to be operated in a fourth mode of operation to transfer asphalt additive from a first external source to a second location, when:
(a) a first external supply line is attached between the second inlet opening of the second inlet pipe and the first external source; and
(b) a second external supply line is attached between the second outlet of the second outlet pipe and the second location; and
(c) the second valve, the fourth valve and the fifth valve are opened; and
(d) the first valve and the third valve are closed; and
the additive pump is activated to draw asphalt additive from the first external source through the first external supply line, the second inlet pipe and the additive pump and out the second outlet pipe through the second external supply line to the second location.

12. The CIR-modified milling machine of claim 9, which includes a drain in the bottom of the surge tank, and is adapted to be operated in a fifth mode of operation to flush the surge tank with a solvent from a source of solvent, when:
(a) an external supply line is connected between the first inlet opening of the first inlet pipe and the source of solvent; and
(b) the drain in the bottom of the surge tank is opened; and
(c) the first valve and the fourth valve are opened; and
(d) the second valve, the third valve and the fifth valve are closed; and
the additive pump is activated to draw the solvent through the first inlet pipe and out the first outlet into the surge tank, and out of the surge tank through the drain.

* * * * *